Jan. 31, 1961

C. A. SHERMAN 2,969,892

STICK DROPPING MECHANISM

Filed April 26, 1956

INVENTOR.
CHARLES A. SHERMAN
BY
Attorney

Jan. 31, 1961

C. A. SHERMAN 2,969,892

STICK DROPPING MECHANISM

Filed April 26, 1956

INVENTOR.
CHARLES A. SHERMAN
BY
Attorney

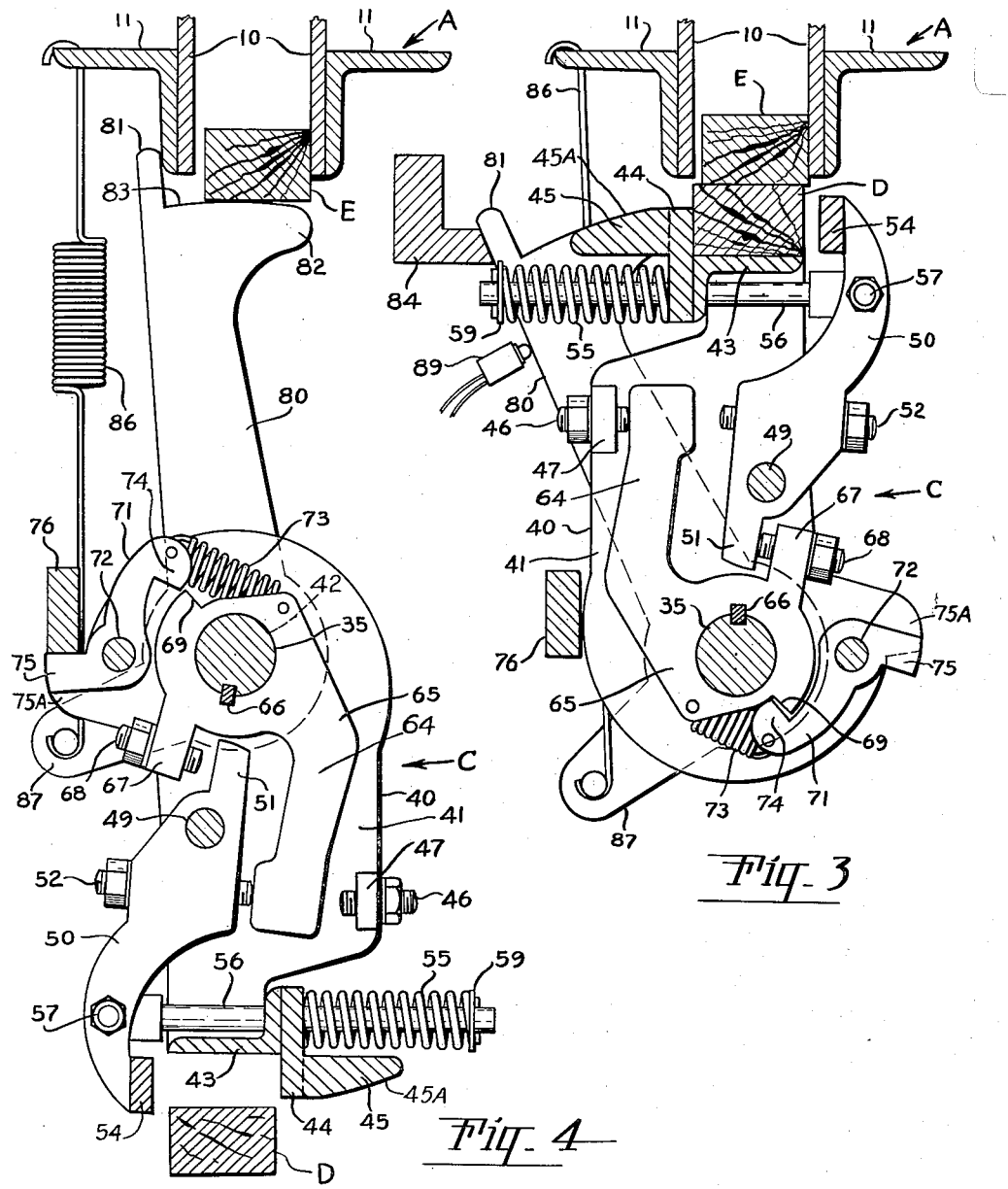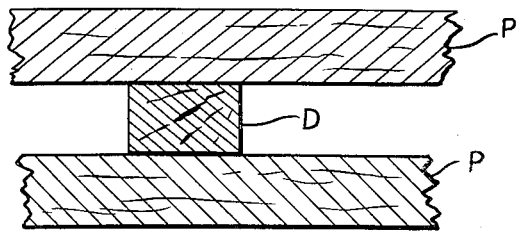

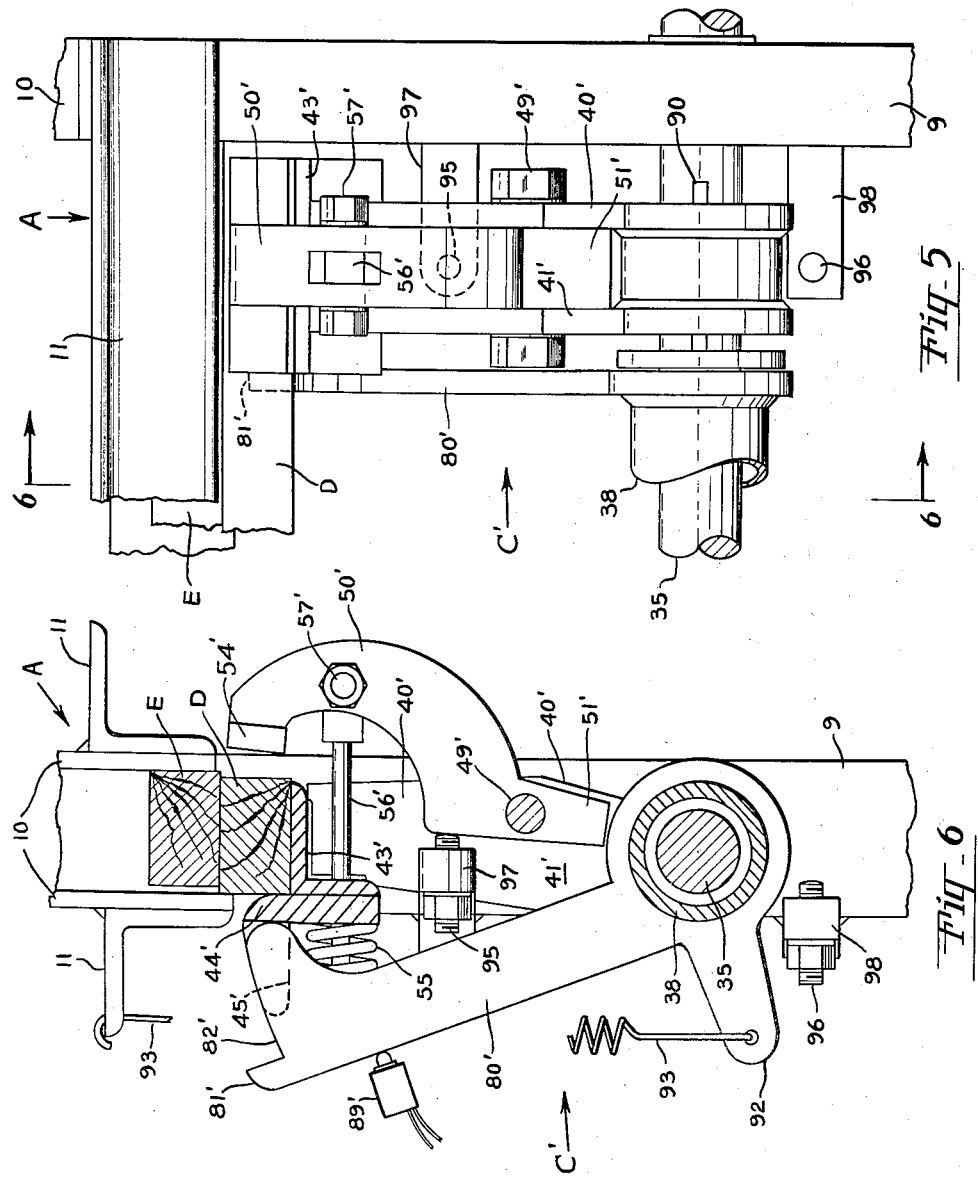

INVENTOR.
CHARLES A. SHERMAN
Attorney

United States Patent Office 2,969,892
Patented Jan. 31, 1961

2,969,892
STICK DROPPING MECHANISM

Charles A. Sherman, Tacoma, Wash., assignor to Weyerhaeuser Company, Tacoma, Wash., a corporation of Washington Filed Apr. 26, 1956, Ser. No. 580,911

8 Claims. (Cl. 221—210)

This invention relates to article handling mechanism, and, although it may be employed for handling various types of articles, it is particularly applicable and described herein in connection with the handling and dropping of strips of material in the form of separator sticks of the type which are placed between adjacent layers of boards or panels in a stack to permit air to circulate therethrough.

Although machinery is commonly employed for stacking lumber and panels, the greatest efficiency and speed of operation of such stacking machines is impaired by the necessity heretofore for manual placement of the separator sticks between layers. The general object of the present invention is, therefore, to provide a mechanical apparatus suitable for use in conjunction with a stacking machine to place the separator sticks quickly and accurately in position on top of each new layer of the stacked material.

An important object of the invention is to provide an improved article handling mechanism which functions efficiently and automatically to remove a single article from a magazine and carry the article to a predetermined release or dropping position.

More specific objects are to provide an article handling mechanism having improved carrier means for transferring an article from a magazine to a release or dropping position; to provide improved carrier operating means for oscillating jaw members of the carrier between an upright position and a lower inverted position while firmly gripping the article and for opening the jaw members at the two positions for respectively receiving the article and for dropping the article at a desired location; to provide improved biasing means for urging the jaw members toward each other in gripping relation; and to provide improved means for retaining articles in a magazine while the jaw members are oscillating between their two positions.

An additional object is to provide an improved article handling mechanism having carriers disposed in spaced relation and operable together for handling elongated articles.

A still further object is to provide an article handling mechanism which is simple and inexpensive to build and which is rugged and reliable in operation.

The objects set out above are accomplished by a mechanism which, in brief, operates to receive a stick from the lower end of a vertical magazine and transfer the stick to a position wherein it can be dropped into place on boards or panels being stacked, or into auxiliary mechanism operative with mechanical stacking equipment. Preferred embodiments of the invention utilize carriers having pairs of jaw members operable by a rock shaft for oscillating movement between an upright stick receiving position and a downwardly disposed stick release or dropping position. The jaw members are operative as a clamp to maintain a firm grip on a stick while moving the stick between the two positions, and abutment or stop means are utilized to open the jaws at their upright and downwardly disposed positions for receiving and discharging the sticks, respectively. Also forming a part of the present mechanism is stick retaining means which operates to hold remaining sticks in the magazine during the time the jaw members are moving a single stick around to a dropping position and which is in the path of a portion of the jaw structure, whereby, as this structure is returning to its upright position, it engages the retaining means and moves the retaining means rearwardly to permit the next stick to discharge by gravity from the magazine into the jaw members.

The invention will be better understood and additional objects and advantages will become apparent from the following description taken in connection with the accompanying drawings which illustrate a preferred form of the invention. It is to be understood, however, that the invention may take other forms, and that all such modifications and variations within the scope of the appended claims, which will occur to persons skilled in the art, are included in the invention.

In the drawings:

Figure 3 is a sectional view of one embodiment of the carrier structure taken on the line 3—3 of Figure 1, and showing the jaw members of the carrier in upright stick receiving position.

Figure 4 is a sectional view similar to Figure 3 but showing the jaw members oscillated to a stick release or dropping position;

Figure 5 is a fragmentary front elevational view of another embodiment of carrier structure;

Figure 6 is a side elevational view taken on the line 6—6 of Figure 5;

First embodiment

Referring first to Figures 1–4, there is illustrated mechanism of the present invention which serves the function of receiving a plurality of elongated sticks or stickers and transferring said sticks one at a time to a lowered dropping position for placement on lumber or panels P being stacked, Figure 4. Essentially, the mechanism comprises a hopper or magazine A, a drive assembly B, and a pair of carriers or transfer devices C. The magazine A has pairs of end upright frame members 10 which form therebetween a guideway for a plurality of sticks, identified by the letters D and E, the sticks identified by the letter D being those which have moved out of the magazine and are either seated in the carrier C, Figure 3, or have been transferred from the magazine and released by the carrier C, Figure 4, and the sticks identified by the letter E being those still in the magazine which have not been removed or transferred. The magazine structure A has longitudinal frame members 11, and the over-all length of the apparatus is dependent upon the length of stick to be handled which is in turn dependent upon the width of the pile to be stacked. In the stacking of narrow piles of lumber or panels, the over-all length of the apparatus will be relatively short, but for stacking wide panel pieces, the apparatus may take the length substantially as shown, the length of the device in the direction of frame members 11 being disposed transversely of the pile.

Figure 1:
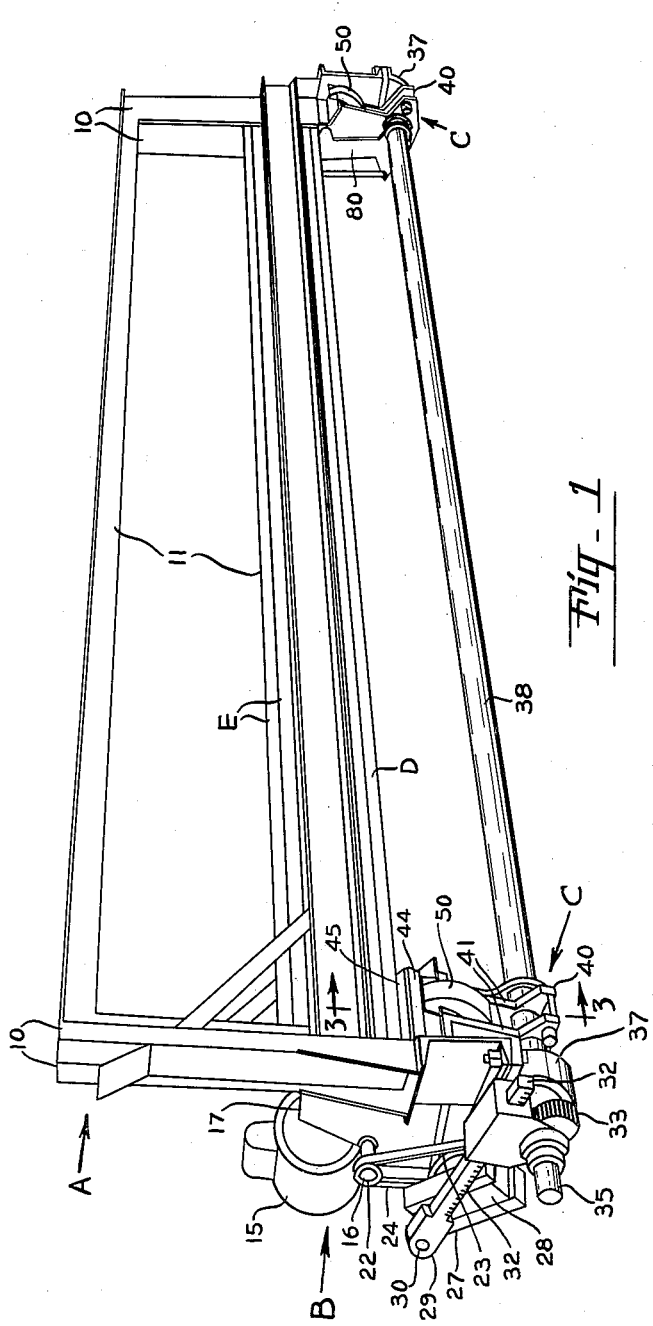
Figure 1 is a perspective view of a stick dropping mechanism of the present invention.
Figure 2:
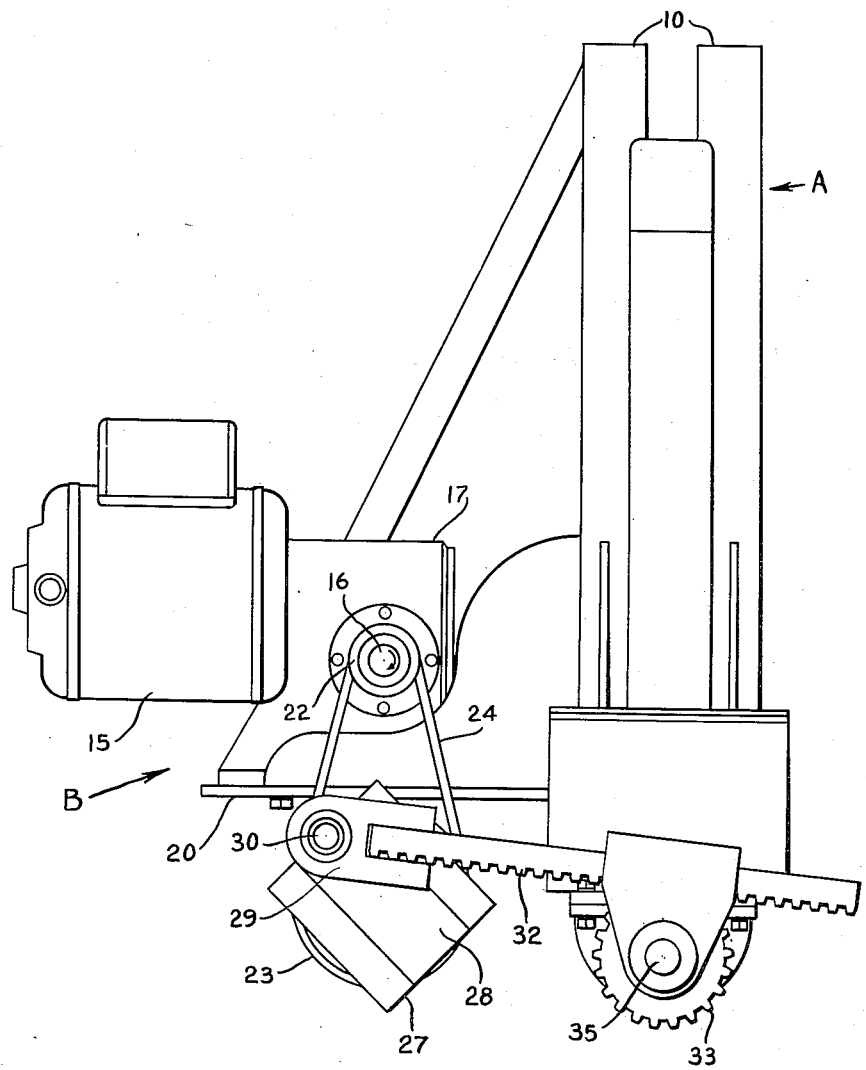
Figure 2 is an end elevational view of the stick dropping mechanism and showing in particular the drive assembly therefor.
Figure 7:
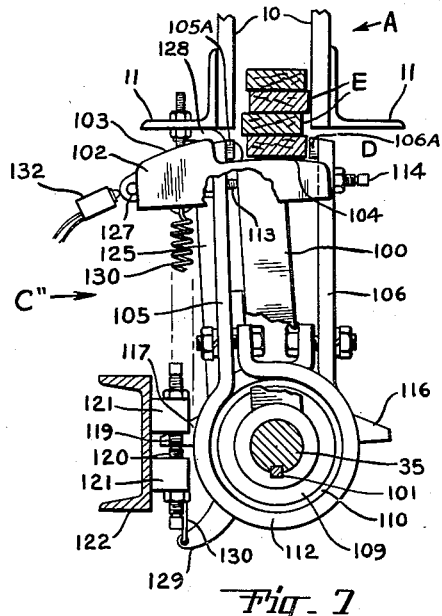
Figure 7 is a side elevational view of still another embodiment of carrier structure.
Figure 10:
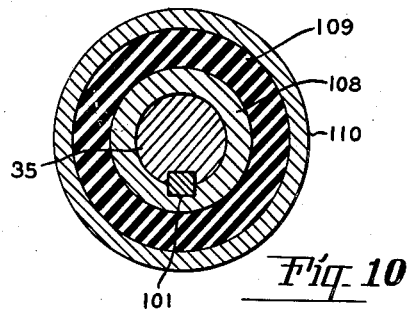
Figure 10 is a detail view of the resilient connection between the jaw members and the oscillating shaft.
Figure 8:
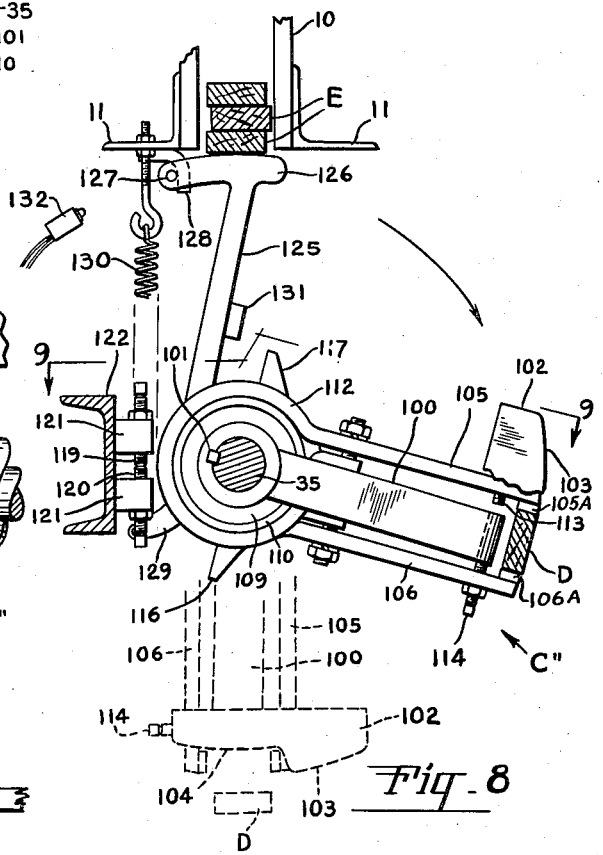
Figure 8 is a view similar to Figure 7 but showing, in full lines, the jaw members oscillated to a point between the stick receiving and stick dropping positions, and showing, in dotted lines, the jaw members oscillated to their stick dropping position.

The drive assembly B, shown in detail in Figure 2, comprises a motor 15 which drives an output shaft 16 through a gear box 17. Although the motor and gear box may be supported on suitable structure apart from the magazine structure, it is shown herein as being secured to the magazine by means of a bracket 20. Output shaft 16 has a pulley 22 thereon which transmits power to another pulley 23 by means of a belt 24. Pulley 23 carries an integral block 27 having an adjustable slide or crank arm 28 mounted therein pivotally connected at one of its ends to a head 29 by a pivot pin 30. Head 29 carries a rack 32 meshing with a gear 33 keyed to a rock shaft 35 which, as seen in Figure 1, extends the full length of the frame 11. Shaft 35 is journalled in suitable bearings 37 at opposite ends of the apparatus and carries a tube 38 rotatable thereon extending between the two carriers or transfer devices C.

With the motor 15 in operation, shaft 16 turns in the direction of the arrow, shown thereon in Figure 2, and crank pin 30 is offset from the center of pulley 23 a sufficient distance to cause reciprocating movement of the rack 32 for oscillating the shaft 35 through an angle slightly exceeding 180°. The throw of the crank arm 28 may be varied by slidable adjustment thereof relative to the block 27, and this adjustment is utilized to obtain the proper degree of oscillation of the shaft 35 for efficient functioning of the carriers C, to be described.

Referring in detail to Figures 1, 3 and 4, there is shown one embodiment of carrier structure C for transferring a single stick from the magazine A to a lower position for release at the desired time. Figure 3 shows the position of the carrier as it is receiving a stick D from the magazine, and Figure 4 shows the position of the carrier after it has transferred the stick to a position therebeneath and has released its grip on the stick. A carrier C is provided on each end of the shaft 35 so that each end of the stick is gripped when being transferred to a pile of lumber or panels.

The carriers C comprise a clevis-shaped jaw member 40 having two spaced arms 41 which are apertured at 42 for pivotally mounting the jaw member 40 for relative rotation on the shaft. Jaw member 40 has a closed end portion comprising a connecting wall 43 forming a seat for the sticks, and an approximately radial wall portion or jaw 44 having a rearwardly projecting finger 45 with a smooth top curved surface 45A. One of the arms 41 of the jaw member 40 is provided with an abutment screw 46 threadedly mounted in a lug 47. The near arm 41 has been omitted from the views in Figures 3 and 4.

Pivotally mounted between the arm portions 41 of jaw member 40 on a pin 49 extending between these arm portions is a second jaw member 50 having a jaw 54, a bottom projection 51 and an abutment screw 52 mounted therein. Jaw member 50 is urged toward closed position relative to the jaw member 40 by means of a tension spring 55 mounted on a link 56 connected to a pin 57 in the jaw member 50 and slidably mounted through wall portion 44 of jaw member 40. Spring 55 is tensioned between wall portion 44 and an abutment washer 59 on the link 56.

Oscillation of the jaw members between their upright stick receiving position, Figure 3, and their lowered stick dropping position, Figure 4, is accomplished by a lever 65 keyed to the shaft 35 by a key 66 and having a short range of movement between the screws 46 and 52. Lever 65 has a projection 64 and a projection or lug 67 in which is mounted a screw 68 adapted to engage the projection or arm 51 on the jaw member 50 at a certain time to open the jaw 54 for receiving a stick, Figure 3. Lever 65 is notched at 69 and this notch is engageable by a projection 74 on detent 71. The detent is pivotally mounted on a pin 72 in the jaw member 40. Detent 71 is biased toward its notch engaging position by a spring 73 connected between one end thereof and the lever 65. The opposite end of the detent 71 has an angular projection 75 adapted to engage a stationary stop 76 in the stick releasing position of the carrier.

Also pivotally mounted for relative rotation on the shaft 35 is an arm 80 having radial and circumferential finger projections 81 and 82 on the free end thereof. The top surface of projection 82 comprises a bottom support for sticks in the magazine A in a first position of arm 80 when the jaw members are rotated away from the magazine in a stick transferring operation. Projection 81 comprises a stop for the arm 80 and is engageable with a frame member 11 for positioning the projection 82 beneath the magazine in said stick transferring operation. Projection 81 is also engageable with a stationary stop 84 in a second position of arm 80, Figure 3, for limiting rotational movement of the arm 80 away from the magazine when the jaw members are brought to a stick receiving position. Arm 80 is biased toward its first position under the magazine by a spring 86 connected between an ear 87 on the arm 80 and a frame member 11. Projection 82 is in the path of and adapted to be engaged by the wall portion 44 of jaw member 40 in certain positions of this jaw member, and, in this regard, it is seen that when the jaw member 40 is in a substantially upright position, Figure 3, the arm 80 is moved back into engagement with its stop 84, whereby one of the sticks is free to fall onto the seat 43. However, when the jaw member 40 is rotated clockwise, the arm 80 moves therewith under the action of its spring 86 to position itself under the lowermost stick in the magazine, the top surface 83 of projection 82 being in substantially the same plane as the top surface 45A of finger projection 45 or slightly therebelow so as to slide freely into engagement with the bottom stick as the jaw member 40 moves away from the magazine. The stick D in Figure 3 projects above these top surfaces to permit the said surfaces to move freely under the bottom stick E in the magazine when the parts move away from the Figure 3 position. The two arms 80 for a pair of the carriers C are mounted on the opposite ends of tube 38 within which the shaft 35 rotates.

A switch 89 in the circuit to motor 15 is disposed in the path of the arm 80 and is adapted to deenergize the motor circuit at the time the carrier reaches its upright stick receiving position with its arm 80 in engagement with stop 84, Figure 3. Electric starting means, not shown, must be operated to re-start the motor 15 for moving the carriers through another cycle.

It has hereinbefore been explained that the jaw members oscillate through approximately 180° between their stick receiving position and their stick dropping position, and, in detailing the operation of the present stick dropping machine, it will be assumed that the jaw members are returning from a stick dropping position and are about to assume their Figure 3 position in counter-clockwise rotation for receiving a stick. In this return movement, projection 74 on detent 71 moves into engagement with notch 69 in the lever 65. Also, in the return movement of the carrier to the stick receiving position, abutment screw 68 engages projection 51 to pivot the jaw member 50 to an open position. Jaw member 40, in approaching the stick receiving position, engages retaining arm 80 and moves it back against the stop 84, and, in reaching this final return movement, the arm 80 engages and opens switch 89 to deenergize the motor 15. The operating circuit to the motor 15 is such that the motor will remain deenergized until the circuit is closed by suitable means operated manually, or by structure operative in conjunction with sticking mechanism. With the carrier in its Figure 3 rest position, the rack 32 is at the left end of its stroke in Figure 2 and in a position to impart clockwise rotation, Figures 2 and 3, to the shaft 35 when the motor is again energized.

Upon re-starting of the drive motor 15, shaft 35 rotates the lever 65 clockwise therewith, and, as the detent 71 on the jaw member 40 is in engagement with notch 69, jaw member 40 rotates with the lever 65, carrying the jaw member 50 bodily therewith. Lost motion is provided between the projection 74 of detent 71 and the notch 69 of lever 65 so that the lever 65 will rotate relative to the jaw 40 in the starting movement of the shaft an amount sufficient such that abutment screw 68, which is engageable with projection 51 of jaw member 50, permits the jaw 54, biased by spring 55, to clamp against a stick which has dropped on the seat 43. As the jaws move away from the bottom of the magazine, retaining arm 80, biased by spring 86, moves therewith until its finger portion 82 is disposed under the magazine. The rotational movement of arm 80 in this direction is limited by finger 81. The sticks E in the magazine are then supported at each end on one of the fingers 82.

Shaft 35 will continue to rotate clockwise until the jaw member 40, together with the lever 65 and jaw member 50, are disposed in their Figure 4 stick dropping position at the limit of movement of rack 32. Just prior to reaching this limit position, however, projection 75 on detent 71 engages a stop member 76, and the detent is pivoted out of engagement with notch 69 of the lever 65 against the action of spring 73, whereby the lever 65 is free to rotate relative to the jaw member 40 which has been stopped by engagement of its projection 75A with the stop 76. The lever 65 continues to rotate a slight amount after disengagement of the detent from the notch 69 whereby this lever engages abutment screw 52 to pivot the jaw member 50 into open position against the action of spring 55. The stick is thus free to fall by gravity into a desired position. The parts are arranged so that the stick is released in a horizontally flat position causing the stick to fall flat on the underlying pile of lumber or panels.

Thereupon, the rack 32 reverses, causing the shaft 35 to be driven a half revolution in a counter-clockwise direction and the parts return to their upright position for receiving another stick, the drive connection between the jaw member 40 and the lever 65 then comprising the abutment screw 46. Detent projection 74 falls behind notch 69, and, when movement of jaw member 40 is stopped by arm 80 in the Figure 3 position, abutment screw 68 moves projection 51 of jaw member 50 to open jaw 54. Rack 32 is then at its limit position and the motor is deenergized by switch 89.

When jaw member 40 encounters resistance in its return movement to its Figure 3 position under the magazine by reason of its frictional engagement under a heavy load of sticks in the magazine, lever 65 comes to bear against stop screw 46 on jaw member 40 to insure that jaw member 40 will be returned all the way to its stick receiving position. Jaw 50 is opened to its fullest extent, as shown, when this occurs.

From the foregoing description of the operation, it is observed that jaw member 40 and arms 41 rotate back and forth through an angle of 180° in order to drop the stick D flat on the pile of boards or panels P. Shaft 35 and lever 65 must, therefore, have sufficient over-travel beyond both limits of movement of jaw member 40 to open the jaw 54 a first time for receiving a stick from the magazine and to open the jaw 54 a second time for dropping the stick. This is shown in Figures 3 and 4 where shaft 35 and lever 65 are seen to rotate slightly more than 180° between the limit positions shown.

While the necessary oscillating or rocking movements of shaft 35 are conveniently produced by a rack and gear drive from a unidirectional electric motor, as shown, other driving arrangements and other power sources may be employed as will be apparent to persons skilled in the art, such as, for example, an air cylinder.

*Second embodiment*

In the embodiment shown in Figures 5 and 6, a carrier C′ comprises a clevis-shaped jaw member 40′ having a pair of arms 41′ keyed to the shaft 35 by a key 90, Figure 5, these views showing a carrier structure mounted on the right-hand end of the stick dropping mechanism. The near arm 41′ has been omitted from the view in Figure 6. The stick engaging end of the jaw member 40′ has a connecting wall 43′ between arms 41′ forming a seat for the sticks and a radial wall portion or jaw 44′ having a rearwardly projecting finger 45′. Pivotally mounted on the jaw member 40′ by a pin 49′ is a jaw member 50′ having a jaw 54′ and a bottom projection 51′. Jaw member 50′ is urged toward the other jaw member by means of a spring 55′ on a link 56′ connected to a pin 57′ in the jaw member 50′. A retaining arm 80′ shrunk or keyed on tube 38, has a pair of projections 81′ and 82′ for limiting the movement of the arm in a first stick retaining position and for supporting the lowermost stick in the magazine when in such position, respectively. The arm 80′ is operative with a switch 89′ for deenergizing the drive motor when the jaw members reach their limit upright position.

The arm 80′ has a projection 92 serving as a spring hanger for tension spring 93. Spring 93, connected between the projection 92 and the frame member 11, urges the arm 80′ clockwise in Figure 6 into a first position under the magazine whereby, similar to the former embodiment, this arm will follow the jaw members as the jaw members move a stick away from the bottom of the magazine. A pair of stationary stop screws 95 and 96 adjustably mounted in lugs 97 and 98, respectively, on a frame member 9 are engageable by the jaw member 50′ in the operation thereof for opening this jaw member in the stick receiving and stick dropping positions.

When the drive assembly is put in operation, shaft 35 drives jaw member 40′ clockwise in Figure 6 away from the magazine. This movement of the jaw member 40′ moves jaw member 50′ away from the abutment screw 95, causing the jaw member to close on the stick D under the action of spring 55′ whereby the stick will be held firmly between the jaw members in the rotary movement thereof. The arm 80′, because of the biasing action of tension spring 93, follows the jaw members until the projection 81′ engages frame member 11, whereupon the finger projection 82′ is disposed below the magazine and prevents displacement of the sticks from the magazine.

Rotation of the jaw members moves the stick to a lower position as in Figure 4, and, as these jaw members approach their limit of rotation, the projection 51′ of the jaw member 50′ engages abutment screw 96. Upon slight additional movement, the jaws are opened and the stick is released. Thereafter, the drive assembly reverses the rotation of shaft 35, and, when jaw member 40′ approaches an upright position, the wall portion 44′ of this jaw member engages the finger 82′ of arm 80′ and pivots the arm away from the magazine into a second position to permit the lowermost stick in the magazine to fall by gravity into the space between the jaws. Also, as the jaw member 40′ approaches its upright position, jaw member 50′ engages abutment screw 95 to open jaw 54′ for the reception of the stick.

Figure 6 shows the parts in rest position with the drive motor deenergized and rack 32, Figures 1 and 2, at the left end of its stroke. Rack 32 rotates shaft 35 slightly more than 180° clockwise in Figure 6 and then returns the parts to the position shown, as previously described in connection with Figures 3 and 4. Any slight overrun of the shaft in its clockwise rotation is taken up by spring 55′ without damage to the mechanism.

*Third embodiment*

Referring to Figures 7–10, a third embodiment of carrier C″ of the invention comprises a clevis-shaped jaw actuating member 100 keyed to the shaft 35 by a key 101. This member has a pair of heads 102, each having a rounded edge portion 103 and an offset edge portion 104. Edge portions 103 slide under the bottom surface of the lowermost stick in the magazine when the jaws are returning to their upright position, and, when this edge portion moves beyond the stick in this return movement, the lowermost stick drops into engagement with the edge portions 104 which form a seat therefor. A pair of jaw members 105 and 106 are each mounted on the shaft 35 by means of a resilient torsion connection, shown in detail in Figure 10, comprising an inner sleeve 108 keyed to the shaft 35 by means of the key 101, a resilient ring 109 such as rubber, and an outer sleeve 110. The resilient ring 109 is bonded or otherwise secured to each of the sleeves 108 and 110, and the jaw members 105 and 106 are secured to respective sleeves 110 by means of a clamping loop or strap portion 112 on one end thereof. The jaw members 105 and 106, having jaws 105A and 106A, respectively are biased toward closed position by the resilient torsion connection and are arranged to grip firmly a stick seated on the edge portions 104 of the heads 102. These jaw members have adjustable abutment screws 113 and 114, respectively, engageable by the cross-bar member 107 of jaw actuating member 100, and also have ears 116 and 117, respectively, engageable with respective adjustable stop pins 119 and 120 threadedly mounted in suitable lugs 121 on a stationary frame member 122.

Mounted on the shaft 35 for free relative rotation is a stick retaining and supporting arm 125 having an upper finger projection 126 adapted to engage the lowermost stick in the magazine for holding the sticks therein. The projection 126 has an integral transverse pin 127 engageable with a bracket member 128 for stopping the rotation of the arm 125 in a first position under the magazine. Arm 125 has an ear 129 formed thereon and is biased in a clockwise direction toward the first position, Figures 7 and 8, by a spring 130 connected between the ear 129 and a frame member 11. Arm 125 carries an integral bar 131 adapted to be engaged by arm 100 in the return movement of the jaws for moving the retaining arm 125 out of engagement with the lowermost stick in the magazine into a second position of arm 125. A switch 132 in the circuit to the drive motor is disposed in the path of arm 125 and is moved to open circuit position when said arm is moved away from the magazine toward the second position.

Figure 9:
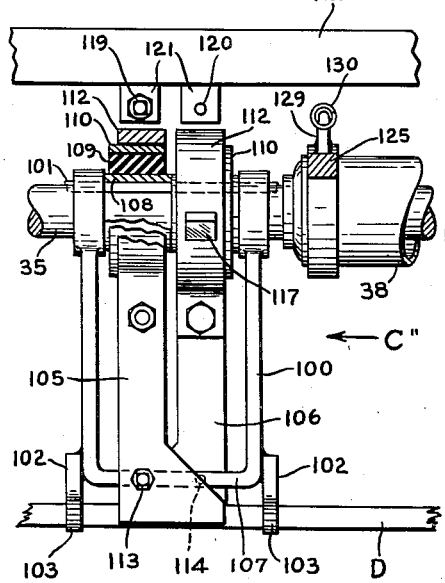
Figure 9 is a sectional view taken on the line 9—9 of Figure 8.

As shown in Figure 9, the two arms 125 for a pair of the carriers C″ are mounted on the opposite ends of tube 38 within which the shaft 35 rotates.

As will be seen hereinafter, when the jaw members 105 and 106 are disposed in their stick receiving position, the cross-bar member 107 of jaw actuating member 100 engages abutment screw 113 of jaw member 105 and holds this jaw member away from the other jaw member 106 an amount sufficient to permit a stick D to drop therebetween into engagement with heads 102. In operation of this embodiment, with a stick D seated on the heads 102, the drive mechanism is actuated, which, in the initial portion of its operation, drives the shaft 35 in a clockwise direction, as viewed in Figures 7 and 8. At the beginning of this rotation, the jaw actuating member 100 disengages from abutment screw 113 to allow the jaw members to grip the stick under the action of the resilient ring 109, and then member 100 moves into engagement with abutment pin 114 on the jaw member 106 to move the jaw members around to their stick dropping position, the jaw 105A being biased firmly into engagement with the stick during this movement.

As the jaw members approach the stick dropping position, the ear 116 on jaw member 105 engages its stop screw 119 to stop rotation of that particular jaw member. The drive mechanism, however, continues to rotate the shaft 35 a slight amount, wherein the jaw actuating member 100 continues to drive the jaw member 106 an amount sufficient to release the stick, this position of the jaw members being shown in dotted lines in Figure 8. After the stick has dropped from the jaws, the direction of the shaft 35 is reversed and the jaw actuating member 100 thereby moves into engagement with abutment screw 113 on jaw member 105 to cause the jaw members to rotate back to their upright position.

In approaching its upright rest position, jaw actuating member 100 engages bar 131 on the arm 125 and pushes said arm out of engagement with the lowermost stick in the magazine. In the meantime, however, the edges 103 of heads 102 have moved into engagement with the lowermost stick. Upon reaching an upright position, the ear 117 on jaw member 106 engages its stop screw 120 and the rotation of this particular jaw member stops. The drive mechanism continues to operate, however, sufficiently for the jaw actuating member 100 to move the jaw member 105 so that a stick can fall between the two jaw members. At this particular time, the arm 125 engages switch 132 to deenergize the drive motor. The motor stops with rack 32 at the limit of its stroke, crank pin 30 being in over-center position to hold the parts in their Figure 7 position until the motor is started again.

Thus, again in the third embodiment, the rock shaft 35 has a slight over-travel beyond a 180° oscillation to open the jaws in receiving and releasing positions. In approaching receiving position, the movement of the trailing jaw member 106 is arrested and the shaft continues to rotate to open the leading jaw member 105 a sufficient amount to receive a stick. In approaching release position, in the opposite direction of rotation, the trailing jaw member 105 is arrested and the shaft continues to rotate to open the leading jaw member 106 a sufficient amount to drop the stick. During each over-travel movement of shaft 35 and torque arm actuating member 100, one of the rubber bushings 109 is distorted like a torsional spring. Upon reversal of the shaft the spring action of the distorted bushing returns the opened jaw to clamping position as shown in full lines in Figure 8.

The present invention affords an efficient and simplified apparatus for removing a single stick at a time from a magazine and moving said stick to a lowered dropping position. The drive mechanism may operate in syncronism with other structure which automatically stacks boards in a pile so that the separator sticks may be dropped automatically as the pile is being formed. The present stick dropping mechanism may also be arranged to deposit individual sticks in temporary holders which operate in synchronism with a board stacking machine whereby the sticks may be deposited on the pile by the holder instead of the present dropping mechanism directly.

Having now described my invention and in what manner the same may be used, what I claim as new and desire to protect by Letters Patent is:

1. An article transfer mechanism comprising a magazine for holding a plurality of elongated articles, a rock shaft, means to rotate said shaft reciprocally approximately 180 degrees, rotatable means carried by said shaft, said rotatable means comprising two pairs of jaw members, one pair adjacent each end of the shaft and positioned below the magazine for receiving a single article at a time above the shaft and transferring said article to a discharging position below said shaft, said jaw members comprising jaws, said rotatable means further comprising means fixed to the shaft for effecting unitary rotation of said jaw members with the shaft between the receiving and discharging positions, said last mentioned means being engageable and disengageable at the receiving and discharging position with elements mounted on at least one of said jaw members to activate said jaws at the receiving and discharging positions, resilient means operative on said jaws for urging said jaws together into gripping engagement with an article therebetween, abutment means operative on one of said jaw members in each of said receiving and discharging positions 180 degrees removed from each other to stop said one of said jaw members operated upon in said position, article retaining means positioned below said magazine, said retaining means having a first position in engagement with a lowermost article in said magazine for supporting said articles and having a second position disposed away from said magazine to permit the article to feed downwardly, means urging said retaining means into said first position, and stop means for positioning said retaining means in said first position, said retaining means being in the path of at least one of said rotatable means for movement to said second position when said jaw members are rotated to said article receiving position.

2. The article transfer mechanism of claim 1 in which each pair of said jaw members comprises a first jaw member pivotally mounted on said rock shaft and a second jaw member pivotally mounted on said first jaw member, and said means fixed to the shaft for effecting unitary rotation of said jaw members with the shaft between receiving and discharging positions is a lever means keyed to said shaft and encircling said shaft, and having a projection on either side of said shaft engageable with said jaw members to effect opening and rotation of said jaw members.

3. The article transfer mechanism of claim 2 in which said second jaw member has an arm on one side of its mounting engageable at the receiving position with one of said projections on said lever means for opening said jaws at that position, and at the opposite side of said mounting said second jaw member has a member engageable with said other projection on said lever means for opening said jaws at said discharging position.

4. The article transfer mechanism of claim 1 in which in each pair of said jaw members, said jaw members are each connected to said rock shaft by resilient means.

5. The article transfer mechanism of claim 1 in which each pair of said jaw members are connected with said rock shaft through resilient bushings and said means fixed to said shaft for effecting unitary rotation of said jaw members with said shaft and for activating said jaws at said receiving and discharging positions is a clevis-shaped arm fixedly mounted on said shaft and having the cross-bar member thereof positioned between the free ends of said two jaw members.

6. The article transfer mechanism of claim 1 in which each pair of said jaw members have relative pivotal movement on said rock shaft, and said means fixed to said shaft for effecting unitary rotation of said jaw members with said shaft, and for activating said jaws at the receiving and discharging positions is a torque arm fixedly mounted on said rock shaft and engageable with the leading jaw member in opposite directions of rotation, and said abutment means are stops engageable with the trailing jaw member in each direction of rotation at points 180 degrees removed from each other and before the torque arm reaches the limit of its movement whereby the final movement of said torque arm in each direction moves the leading jaw away from the trailing jaw to open said jaws.

7. The article transfer mechanism of claim 6 in which said each pair of said jaw members is connected for relative pivotal movement with said shaft through resilient bushings.

8. The article transfer mechanism of claim 6 in which said retaining means is engageable with said torque arm for rotating movement as said jaws and torque arm approach said receiving position.

References Cited in the file of this patent

UNITED STATES PATENTS

| | | |
|---|---|---|
| 1,325,752 | Pope | Dec. 23, 1919 |
| 1,864,008 | Wright | June 21, 1932 |
| 2,256,282 | Harris | Sept. 16, 1941 |
| 2,420,299 | Campbell | May 13, 1947 |
| 2,609,946 | Brager et al. | Sept. 9, 1952 |